(12) United States Patent
Reboredo Losada et al.

(10) Patent No.: US 7,233,221 B2
(45) Date of Patent: Jun. 19, 2007

(54) MAGNETIC WHEEL FOR VEHICLES

(75) Inventors: Oscar Reboredo Losada, Sada (ES); Manuel Varela Rey, Sada (ES)

(73) Assignee: Applus Norcontrol, S.L. (Sociedad Unipersonal), Sada (A Coruna) (ES)

( * ) Notice: Subject to any disclaimer, the term of this patent is extended or adjusted under 35 U.S.C. 154(b) by 0 days.

(21) Appl. No.: 10/546,355

(22) PCT Filed: Feb. 17, 2004

(86) PCT No.: PCT/ES2004/000068

§ 371 (c)(1),
(2), (4) Date: Mar. 24, 2006

(87) PCT Pub. No.: WO2004/074011

PCT Pub. Date: Sep. 2, 2004

(65) Prior Publication Data

US 2006/0162610 A1    Jul. 27, 2006

(30) Foreign Application Priority Data

Feb. 19, 2003   (ES)   ................. 200300402

(51) Int. Cl.
 *H01F 7/02*   (2006.01)
 *B60B 19/00*  (2006.01)
 *B61C 15/04*  (2006.01)
(52) U.S. Cl. .................. 335/302; 105/78; 180/901; 301/5.23
(58) Field of Classification Search ........ 335/302–306; 105/78; 180/901; 301/5.23
See application file for complete search history.

(56) References Cited

U.S. PATENT DOCUMENTS 2,694,164 A    9/1954   Geppelt (Continued)

FOREIGN PATENT DOCUMENTS

EP    0200837    11/1986

(Continued)

OTHER PUBLICATIONS

Patent Abstracts of Japan, vol. 2000,n°5 Sep. 14, 2000, and JP 2000043503 A (Kazumotor, Hashizume) Feb. 15, 2000, Figures 2,8.

(Continued)

*Primary Examiner*—Ramon M. Barrera
(74) *Attorney, Agent, or Firm*—Ladas & Parry LLP

(57) ABSTRACT

Specially conceived for vehicles which have to be displaced over ferromagnetic surfaces, like the iron or steel walls of large tanks for example, it is incorporated by the combination of a hollow rim (1–1') and a tyre (4) of an elastomer or similar material, which define a cylindrical chamber (8) inside which a magnetic annulus (9) runs, materialized in a permanent magnet of adequate strength, with the particularity that said magnetic annulus (9) has a substantially smaller diameter than that of the cited chamber (8), so that it is capable of carrying out a planetary motion inside the same, maintaining a permanently tangential condition with the tyre (4) at the point in which the latter is in contact at all times with the ferromagnetic surface over which the vehicle is displaced, achieving maximum adherence at said point. In this way it is managed to improve the grip of the wheel on said surface, overcome possible obstacles of the same, lighten the wheel and increase safety through not requiring an electricity supply.

4 Claims, 2 Drawing Sheets

U.S. PATENT DOCUMENTS 5,220,869 A    6/1993   Pelrine
6,125,955 A    3/2000   Zoretich

FOREIGN PATENT DOCUMENTS

| FR | 686860  | 7/1930 |
|----|---------|--------|
| FR | 724958  | 5/1932 |
| GB | 2123704 | 2/1984 |

OTHER PUBLICATIONS

Patent Abstracts of Japan, vol. 013, n°189(M-821) May 8, 1989, and JP 1016402A (Hitachi Ltd. et al) Jan. 19, 1989), (Figure 2).

MAGNETIC WHEEL FOR VEHICLES

OBJECT OF THE INVENTION

The present invention relates to a magnetic wheel which has been specially conceived for vehicles which are displaced over a surface of ferromagnetic material such as for example iron or steel.

The invention is specially applicable to inspection or examination vehicles which are displaced, duly controlled, over the vertical surface of large tanks, ships and other similar elements.

BACKGROUND OF THE INVENTION

In the aforementioned example of practical application of the invention, that of large metal tanks and ships, small vehicles are used for examination of their structure, complementary facilities, etc., capable of being displaced vertically over said surface, duly powered, using as means of support against the force of gravity wheels which are also metallic, generally assisted by electromagnets of adequate strength, so that the wheels themselves become a magnet which maintains them adhering adequately to the metallic surface over which they have to be displaced, with the possibility of rotating.

These wheels present a problem which is centred fundamentally on three aspects:

Their metallic nature means that the coefficient of friction with respect to the also metallic surface over which they have to be displaced is minimum, which requires the use of high-powered electromagnets to assure their adherence, which is directly proportional to the volume of their windings, and consequently to the weight of the same, which impacts negatively on the vehicle which is compelled to displace a greater load. This occurrence is specially important in vertical displacements.

The rigidity of the tread surface, arising also from its metallic nature, produces problems in the displacement of the vehicle, specifically when the latter encounters welds or any other type of irregularity which are habitually present on the walls of the tank or element over which said vehicle must move, resulting in loss of adherence and not allowing them to be surpassed.

The dependence on a power supply source, specifically on the battery of the vehicle, signifies a risk from the safety point of view, as well as a substantial consumption of energy.

DESCRIPTION OF THE INVENTION

The wheel that the invention proposes resolves the previously explained problem in a fully satisfactory manner, in the various aspects mentioned.

To this end and in more specific terms, the wheel of the invention is structured by means of a hollow rim which configures a cylindrical chamber with the collaboration of a tyre made of an elastomer or similar material, which determines an optimum grip on the bottom surface, by its very nature, there being housed in the cylindrical chamber defined by the rim and the tyre a magnetic annulus, materialized in a permanent magnet of adequate strength, with the special particularity that said annulus is radially under-dimensioned with respect to the chamber mentioned, undergoing inside the same a hypocycloidal motion, so that by means of this reduction of diameter in the magnetic annulus a substantial approximation is achieved of its geometric axis to the bearing surface and, in consequence, an increased intensity of the magnetic field in the contact zone with said surface, which allows magnetic annuluses of less weight to be used to achieve the same grip, thereby reducing the weight of the actual wheel as a whole.

In this way a lightweight wheel is obtained which adheres strongly to ferromagnetic materials, which offers a high resistance to slipping on smooth surfaces, like for example on painted surfaces, and which also has a passive adherence, that is, with no need for an electricity supply, which allows the safety level of the vehicle to be increased, and all this with a greater capacity for surpassing obstacles, such as the cited irregularities in the surface over which it must travel.

DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented.

PREFERRED EMBODIMENT OF THE INVENTION

Figure 1:
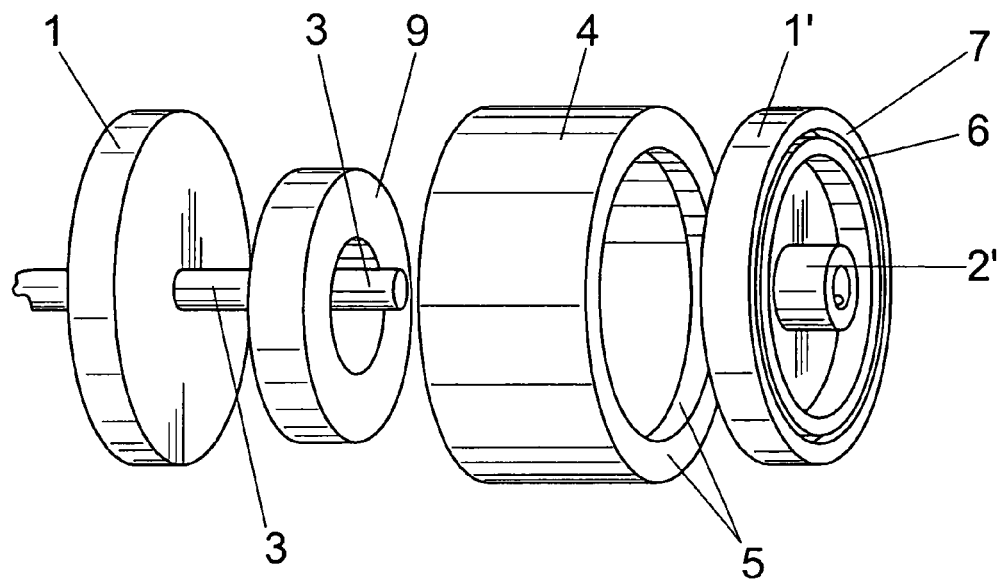
FIG. 1.—It shows an exploded view in perspective of a magnetic wheel for vehicles implemented in accordance with the object of the present invention.
Figure 2:
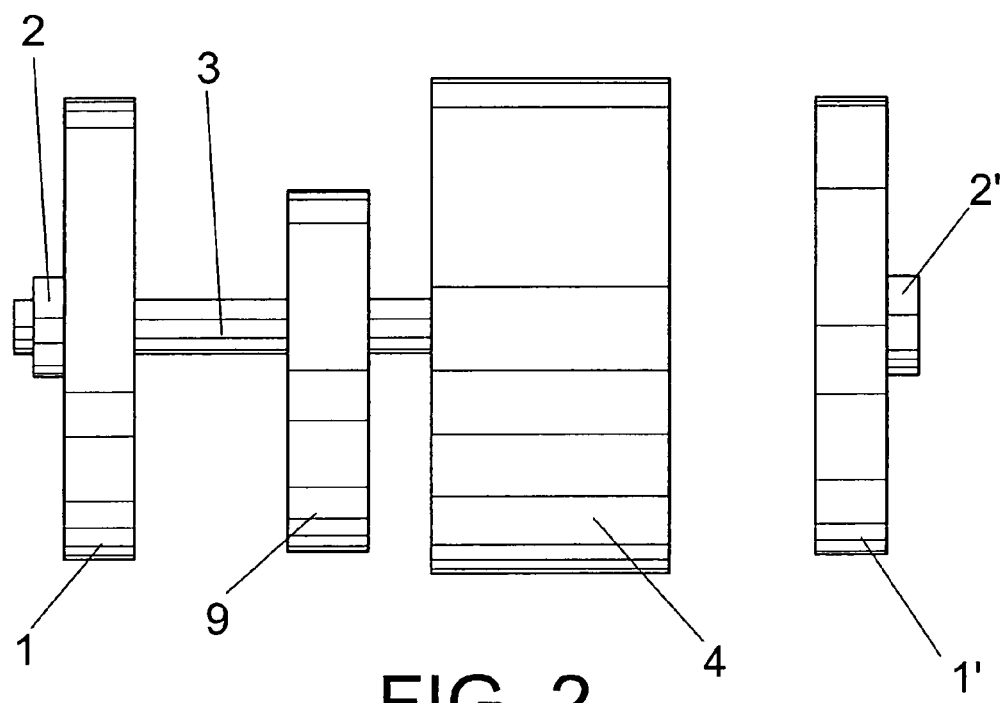
FIG. 2.—It shows another exploded view of the wheel, now seen from the side with respect to the axle of the same.
Figure 3:
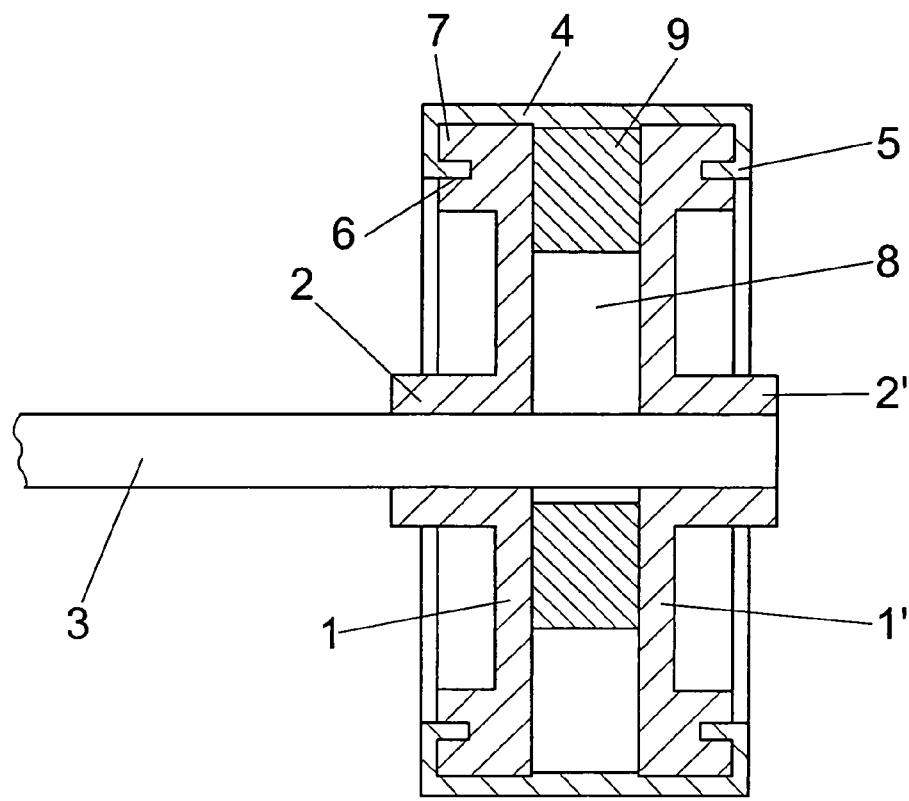
FIG. 3.—It shows a parietal section of the same wheel.
Figure 4:
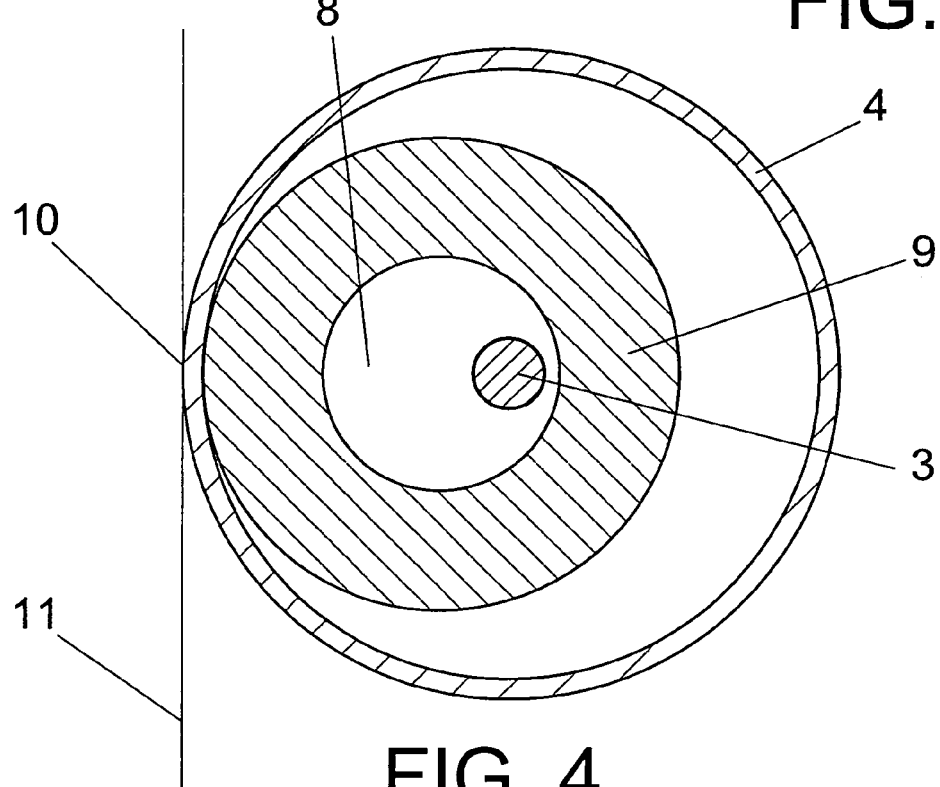
FIG. 4.—It shows, finally, a section through a middle plane perpendicular to the axle of the wheel.

In the light of the aforesaid figures, it can be observed how the magnetic wheel which the invention discloses is constituted from a rim in which participate two disks or circular plates (1-1'), provided with respective cylindrical and axial necks (2-2') through which said rim is secured to the shaft (3) of the motor, said rim (1-1') receiving a tyre (4), preferably of an elastomeric material, such as for example rubber, with its edges (5) flanged and coupled in a tongue and groove arrangement in annular slots (6) of peripheral and external extensions (7) of the cited disks (1-1'), as is also observed in FIG. 3, rim (1-1') and tyre (4) configuring an annular and closed chamber (8) inside which a magnetic annulus (9) runs, materialized in a permanent magnet, which as is observed especially in FIG. 4 has a substantially smaller diameter than the diameter of the cited chamber (8), inside which it is capable of being displaced in a planetary or hypocycloidal manner when the rotation of the wheel takes place through the advance of the vehicle to which it is connected, for which reason the axial measurement of the annulus (9) is slightly under-dimensioned with respect to the axial measurement of the chamber (8).

The elastomeric tyre (4) assures optimum gripping conditions of the wheel as a whole to the surface over which the vehicle must be displaced, with the possibility of easily surpassing any type of irregularities in said surface, whilst the magnetic annulus (9), which on one hand increases the safety of the vehicle through being a permanent magnet which does not need an electricity supply, has on the other hand a minimum weight because its removable character inside the chamber (8), specifically because of its hypocycloidal motion, allows a force of maximum adherence to be maintained at all times in correspondence with the point (10)

of contact between the tyre (4) and the surface (19) over which the vehicle has to be displaced, a force of adherence near to that which would be produced by a magnetic annulus (9) of larger dimensions, and consequently of greater weight, but coaxial with the wheel itself.

The invention claimed is:

1. Magnetic wheel for vehicles, especially for vehicles intended to be displaced over ferromagnetic surfaces, of iron or steel, such as those which constitute the side walls of tanks of large dimensions and the like, characterized in that it is incorporated from a rim (1-1'), supplemented with a tyre (4) of an elastomeric material, so that rim (1-1') and tyre (4) configure a cylindrical chamber (8), inside which a magnetic annulus (9) is installed, specifically a permanent magnet of adequate strength, with the special particularity that the diameter of said magnetic annulus (9) is substantially smaller than the diameter of the chamber (8) established inside the rim, and that said magnetic annulus (9) is enabled to be displaced hypocycloidally inside said chamber (8).

2. Magnetic wheel for vehicles, according to claim 1, characterized in that the rim cited is structured on the basis of two circular disks (1-1') provided with respective cylindrical and coaxial necks (2-2'), through which it is coupled to the shaft (3) of the drive motor of the same, said disks (1-1') being identical, parallel and coaxial.

3. Magnetic wheel for vehicles, according to, claim 1, characterized in that the axial measurement of the magnetic annulus (9) is slightly under-dimensioned with respect to the axial measurement of the chamber (8), to allow the free hypocycloidal displacement of the first inside the second.

4. Magnetic wheel for vehicles, according to claim 2, characterized in that the axial measurement of the magnetic annulus (9) is slightly under-dimensioned with respect to the axial measurement of the chamber (8), to allow the free hypocycloidal displacement of the first inside the second.

* * * * *